P. H. Van der Weyde.
Fire Test for Oils.
Nº 104,798.           Patented Jun. 28, 1870.
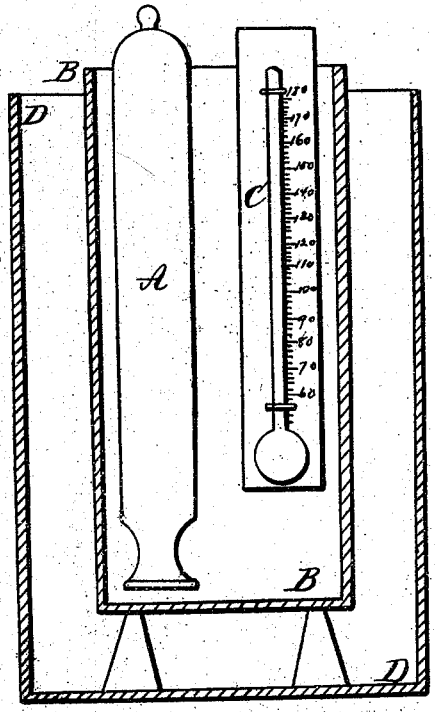
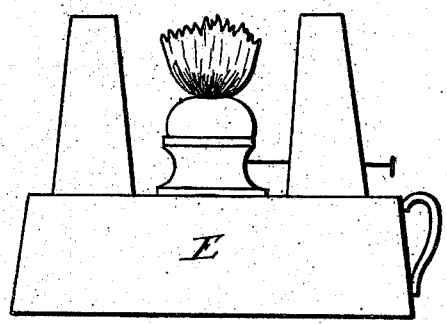
Witnesses:
F. W. Ritter
H. P. Sanders
Inventor:
P. H. Van der Weyde

United States Patent Office.

PETER H. VANDER WEYDE, OF NEW YORK, N. Y.

Letters Patent No. 104,798, dated June 28, 1870; antedated June 6, 1870.

---

IMPROVED INSTRUMENT FOR TESTING OILS.

---

The Schedule referred to in these Letters Patent and making part of the same.

---

*To all whom it may concern:*

Be it known that I, PETER H. VANDER WEYDE, M. D., of the city, county, and State of New York, have invented a new and improved Method of Testing "Oils for Burning," to ascertain what is known as the "flashing-point" of such oils; and I have devised and arranged the same with such simplicity that those of the general public, otherwise unskilled in such experiment and observation, can, with my method and apparatus, make the test with a safety and accuracy hitherto impossible to them.

I base my invention on the facts that all vapors given off by such named oils are combustible at the touch of flame, and they produce, when so ignited, the so-called flashing. Hence it is unnecessary to ignite the vapors from the oils, but only to disengage them, and exhibit the temperature at which they are evolved from any oil.

Secondly, that vapors disengaged in free air so rapidly dissipate, unobserved, from air-currents, that the unskilled cannot with certainty detect the first flashing temperature of the oil by the use of flame. Hence I collect the vapors at the moment of generation in a tight receptacle, isolating them from the air, and so providing for the measurement of their quantity, and the exact temperature of their evolvement, that the exact knowledge of their existence and volatility in the oil is gained by any person of ordinary intelligence, and that without the fear of danger from the direct application of fire.

I do therefore hereby declare that the following is a full and exact description of my method and apparatus therefor.

The nature of my invention consists in the use of a chamber to contain the oil to be tested, made of transparent glass, narrow but deep, the opening of which, being at one end, is capable of being closed entirely by the finger; a vessel of tin or other metal to hold water, sufficiently large to admit the chamber of glass, when upright, in immersion; a thermometer within, and protruding from such metal vessel to show at all times the temperature of the water within it; and also of an outer vessel of tin to contain the aforementioned tin vessel to receive heated or boiling water to raise the temperature of the inner vessel, and of the water therein, and consequently of the glass chamber with the oil immersed in the inner vessel, without the direct action of fire, (but the said outer vessel may be omitted, and a lamp or fire be used to heat the inner vessel directly, if ever that may seem more desirable.)

My method of testing oils with this apparatus is—

First, to fill the inner metal vessel with water at the atmospheric temperature nearly to its brim.

Secondly, to fill the glass-chamber with the oil to be tested, to overflowing, and then to stop its aperture by placing a finger over the same, so tightly as to exclude the air and hold in the oil. Then reverse the chamber and immerse it, mouth downward, in the water in the said vessel; when the mouth is under water the finger to be removed, and the oil will not flow out, but the chamber will remain absolutely full of the oil.

I then note the temperature of the water in said vessel by the thermometer placed therein, and proceed to raise the temperature of the vessel and its contents by pouring heated water into the outer vessel surrounding the same, as before described, permitting the heated water to flow away from the outer chamber as it gives off its heat, and continuing to pour fresh supplies, by which I am enabled to raise the temperature of the inclosed oil in any ratio of time prescribed for oil tests, at my will.

When the most volatile constituents of the oil arrive at the temperature of their disengagement and volatilization, they rise to the top of the chamber and stand over the oil perfectly apparent to the eye. At the time of the rising of the first quantity that becomes clearly apparent, the thermometer will indicate the temperature of the true "flashing point" of that oil, and the bulk of the vapor at any temperature exhibit, indicates truly the amount of vapors contained in such oil volatilizable from same at such temperature.

I can, from time to time, lift the chamber in the water to note more accurately and to assist the vapor in displacing the oil at the top, provided I keep its mouth always submerged. The displaced oil, of course, flows out into the surrounding water.

To enable others to construct my apparatus to employ my method, I more fully describe the same, referring to the accompanying drawing, viz:

I make the glass-chamber A, of which I find the most convenient form to be a tube closed at one end, with a little knob formed there to lift it by, tube to be about six inches in length and an inch or less in diameter, the open end to be formed into a mouth or aperture of such size that it may be completely closed with the finger pressed upon it. The lip at the mouth is extended on opposite sides sufficiently to act as a base to stand upright upon when reversed, while on two sides the lip is depressed to admit the form of the finger laid in it, so that the contents of the chamber may find free exit through these depressions when the chamber stands on its lip, as reversed and in operation.

When desired to measure the quantity of vapor proportioned to the oil, I mark the chamber at intervals of aliquot parts on the glass.

I provide a tin vessel, B, furnished with a thermometer, C, fixed or movable, of such position and length that the temperatures of the contents of B may be easily perceived.

The size of B should be, in width, sufficient to immerse A therein when held perpendicularly, and with the finger firmly held to the aperture until that is under the water.

The depth of B should be sufficient to immerse all of A when immersed and standing on its lip in B, excepting, perhaps, one inch of A, which may protrude for observation.

I construct around B an outer vessel, also open at the top, or a jacket of tin, D, giving a space of one inch, say, between the walls and bottoms of B and D, but I make the upper rim of D, say, one-half of an inch lower than the upper rim of B, so that the pouring in or overflow from D of the heated water may not disturb the contents of B.

D may be dispensed with and heat applied directly to B, if in any case that seems desirable, by means of the lamp E, or otherwise, without changing my method of evolving and collecting vapors, except as to time and public fears of safety.

What I claim, and desire to secure by Letters Patent as my invention, is—

1. The vaporizing of hydrocarbon oils or fluids in a transparent close chamber, having its only vent sealed by water, in such manner that the vapors of such fluids will be isolated, held, and exhibited, and the temperature of "flashing point" shown, as described.

2. Chamber A, or its equivalent, in combination with vessel B, with its thermometer, as described, and for the purposes mentioned.

3. An outer vessel or jacket, D, in combination with chamber A and vessel B, for the purposes mentioned.

In witness whereof I have signed my name in presence of two witnesses.

P. H. VANDER WEYDE, M. D.

Witnesses:
ADOLPH OTT,
CARLOS BUTTERFIELD.